US010296917B2

(12) United States Patent
Chung

(10) Patent No.: US 10,296,917 B2
(45) Date of Patent: May 21, 2019

(54) AUTHENTICITY VERIFYING SYSTEM FOR VERIFYING PRODUCT AUTHENTICITY

(71) Applicant: Hae-Tahk Chung, Seoul (KR)

(72) Inventor: Hae-Tahk Chung, Seoul (KR)

( * ) Notice: Subject to any disclaimer, the term of this patent is extended or adjusted under 35 U.S.C. 154(b) by 1332 days.

(21) Appl. No.: 14/374,959

(22) PCT Filed: Jan. 22, 2013

(86) PCT No.: PCT/KR2013/000495
§ 371 (c)(1),
(2) Date: Jul. 28, 2014

(87) PCT Pub. No.: WO2013/111958
PCT Pub. Date: Aug. 1, 2013

(65) Prior Publication Data
US 2014/0379597 A1    Dec. 25, 2014

(30) Foreign Application Priority Data
Jan. 27, 2012    (KR) .................. 10-2012-0008430

(51) Int. Cl.
*G06Q 30/00*    (2012.01)
*G07C 9/00*    (2006.01)
*G06F 21/10*    (2013.01)
*H04L 29/06*    (2006.01)
*G06F 21/31*    (2013.01)

(52) U.S. Cl.
CPC ......... *G06Q 30/0185* (2013.01); *G06F 21/10* (2013.01); *G06F 21/31* (2013.01); *G07C 9/00571* (2013.01); *G07C 9/00896* (2013.01); *H04L 63/083* (2013.01); *G07C 9/0069* (2013.01); *G07C 9/00182* (2013.01)

(58) Field of Classification Search
CPC .................................................. G06Q 30/0185
USPC ........................................................ 705/318
See application file for complete search history.

(56) References Cited

FOREIGN PATENT DOCUMENTS

| JP | 2004-011313 A | 1/2004 |
| JP | 2005-196386 A | 7/2005 |
| KR | 10-2004-0097400 A | 11/2004 |
| KR | 10-2007-0103993 A | 10/2007 |
| KR | 10-2011-0087957 A | 8/2011 |

*Primary Examiner* — Maria C Santos-Diaz
(74) *Attorney, Agent, or Firm* — Maschoff Brennan

(57) ABSTRACT

The present disclosure provides an authenticity verifying system capable of generating renewed database and updating unlock number upon occurrence of information leak, and comprises product (1) having lock device (11) with infrared ray transceiving unit (12) and keypad (14), and scratch card (13) with password and product serial number provided thereon; a manufacturer's verifying server (2) for verifying product authenticity through a commercial communication network; and an unlock number change device (3) responsive to leak of information stored in server (2) for downloading, from server (2), predetermined password that matches product (1) and renewed unlock number newly matched to the product serial number. Further, the present disclosure provides a method for verifying product authenticity through acquiring an unlock number, and comprises performing an unlock number acquiring process and applying the unlock number acquired to lock device (11) of product (1) to unlock lock device (11).

4 Claims, 3 Drawing Sheets

(a)

(b)

(c)

AUTHENTICITY VERIFYING SYSTEM FOR VERIFYING PRODUCT AUTHENTICITY

TECHNICAL FIELD

The present disclosure relates to a system and a method for authenticity verification of genuine products. In particular, the present disclosure relates to a system for enabling a purchaser to verify the authenticity of a product in a shop definitely and immediately through the manufacturer's website by verifying the product authenticity by the product serial number and the release code to unlock the lock device attached to the product and for controlling to generate a renewed database and update an unlock number in response to an information leak, and to a method for product authenticity verification with an acquired unlock number.

BACKGROUND ART

In the course of making and distributing manufacture's original products to consumers, some persistent issues remain as follows:

There is a concern for unauthorized diversion of some products from their manufacturing or distribution stage to a black market for illegal sales of the products which are genuine. Meanwhile, fake products may join the regular distribution channel to incur a market disorder. In addition, imitations of genuine designs are often produced illegally and sold through various channels online and offline. Consumers are neither able to distinguish between a genuine product and a fake one and they are mislead to buy the fake product for the price of the real one.

Thus, when purchasing a name brand bag or other products of high values, most prospect buyers lacking the technical knowledge on the product are practically unable to ascertain its authenticity without the enlistment of expert help.

In addition, from the manufacturer's point of view, there is the increasing need for eliminating damage to the manufacturers' established images owing to fake goods purchased by unsuspecting consumers.

The existing methods to solve these issues offer branding products with specific identification means such as trademarks, holograms and telephone verification codes. However, since fabricators of illegal counterfeit products extend their counterfeiting to make and distribute even the identification means, the consumers in reality still suffer from the difficulty of verifying the authenticity of imitations. Therefore, such methods of using marks and logos lead to no satisfaction because they are vulnerable to imitating and plagiarizing regardless of the degree of sophistication or uniqueness thereof

DISCLOSURE OF INVENTION

The present disclosure has been made in view of the aforementioned state of the art to provide a system for enabling a purchaser to verify the authenticity of a product in a shop definitely and immediately through a product password, serial number and release code by verifying the product authenticity by the product serial number in a lock device attached to the product and for controlling, in response to an information leak, to generate a renewed database and update the release code, and to a method for product authenticity verification with an acquired release code.

TECHNICAL SOLUTION

To achieve these and other advantage and in accordance with the purpose of the invention, as embodied and broadly described herein, there is provided an authenticity verifying system for verifying product authenticity through verification of product serial number, equipped with lock device, which includes:

a product 1 comprising a lock device 11 with an infrared ray transceiving unit 12, and a scratch card 13 with a password and a product serial number written thereon; and a manufacturer's verifying server 2 for verifying product authenticity through a commercial communication network, wherein the server 2 comprises:

a password input unit 21 receiving a password written on the scratch card 13 of the product 1;

a password verifying unit 22 verifying a password by using a database DB1 in which passwords are stored, on the basis of a password received from the password input unit 21;

a product serial number input unit 23 receiving a product serial number written on the scratch card 13 when a password of the product 1 is verified in the password verifying unit 22;

a product serial number verifying unit 24 verifying a product serial number by using a data base DB2 in which product serial numbers are stored, on the basis of a product serial number received from the product serial number input unit 23;

a release code search unit 25 searching an unlock number or a release code by using a database DB3 in which release codes are stored, when the product serial number verifying unit 24 verifies a product serial number from a database DB2; and a code number output unit 26 outputting a release code searched from the release code search unit 25 for a purchaser to verify the release code, wherein an outputted release code is applied to the lock device 11, the lock device 11 is unlocked, and thus, a product's authenticity is verified.

There is provided an authenticity verifying system which is capable of generating new database and updating release code upon occurrence of information leak, which includes:

a product 1 comprising a lock device 11 with an infrared ray transceiving unit 12, and a scratch card 13 with a password and a product serial number written thereon;

a manufacturer's verifying server 2 for verifying product authenticity through a commercial communication network; and a release code change device 3 for downloading a newly-generated release code newly matched to a password and a product serial number matched to the product 1 from the server 2 upon leak of information stored in the server 2, wherein the server 2 comprises:

a password input unit 21 receiving a password written on the scratch card 13 of the product 1;

a password verifying unit 22 verifying a password by using a database DB1 in which passwords are stored, on the basis of a password received from the password input unit 21;

a product serial number input unit 23 receiving a product serial number written on the scratch card 13 when a password of the product 1 is verified in the password verifying unit 22;

a product serial number verifying unit 24 verifying a product serial number by using a data base DB2 in which product serial numbers are stored, on the basis of a product serial number received from the product serial number input unit 23;

a release code search unit 25 searching a release code by using a database DB3 in which release codes are stored, when the product serial number verifying unit 24 verifies a product serial number from a database DB2; and a release code output unit 26 outputting an newly-generated release code searched from the release code search unit 25 for a purchaser to verify the release code, wherein the release code change device 3 transmits infrared ray data comprising information of the newly-generated release code downloaded from the database DB3 to an infrared ray transceiving unit 12 of the lock device 11 by using an infrared ray communication through an infrared ray transceiveing unit 31, and thus, an existing release code of the lock device 11 is changed to the newly-generated release code, and a release code, which is newly generated to be outputted for responding to information leak irrespective of whether information leak occurs or not, is applied to the lock device 11, the lock device 11 is unlocked, and thus, a product's authenticity is verified.

Moreover, in the present invention, a password of the database DB1 in which passwords are stored, a product serial number of the database DB2 in which product serial numbers are stored, and a release code of the database DB3 in which release codes are stored may be matched in a relationship such as 1:1:1.

Moreover, in the present invention, if the server 2 receives the password and the product serial number to output the release code one time, the server 2 does not receives the password and the product serial number, which have been received once, anymore.

Moreover, in the present invention, the lock device 11 may be a digital lock with keypad 14.

Moreover, in the present invention, the lock device 11 is configured with a mechanical number key.

There is provided to a method for product authenticity through acquiring release code, which includes:

acquiring a release code through acquiring release code; and applying the release code to the lock device 11 to unlock the lock device 11 to enable an authenticity of a product 1 to be verified, wherein the acquiring of the release code comprises:

receiving, by a password input unit 21 of a manufacturer's verifying server 2, a password which is verified by scratching a scratch card 13 adhered to a product 1 (step S1);

verifying, by a password verifying unit 22 of the server 2, a password of a product by using a database DB1 in which passwords are stored (step S2);

receiving, by a product serial number input unit 23 of the server 2, a product serial number written on the scratch card 13, when the password of the product is verified from the database DB1 (step S3);

verifying, by a product serial number verifying unit 24 of the server 2, a product serial number by using a database DB2 in which product serial numbers are stored, on the basis of a received product serial number (step S4);

searching, by a release code search unit 25, a release code by using a database DB3 in which release codes are stored, when the product serial number verifying unit 24 verifies a product serial number from the database DB2 (step S5); and outputting, by a release code output unit 26, a searched release code after the release code is verified from the database DB3 to enable a purchaser to acquire the release code (step S6).

Moreover, in the present invention, if a password of a product 1 is not verified from the database DB1 in the step S2, it is determined that the password is not valid, and thus, the acquiring of the release code terminates.

Moreover, in the present invention, if a product serial number is not verified from the database DB2 in the step S4, it is determined that the product serial number is not valid, and thus, the acquiring of the release code terminates.

Moreover, in the present invention, if the server 2 receives the password and the product serial number to output the release code one time, the server 2 does not receives the password and the product serial number, which have been received once, anymore.

BEST MODES FOR CARRYING OUT THE INVENTION

The prior art of Korean Patent Registration No. 404,869 entitled "A Method for Authenticating Goods and A System Therefor" comprises a single procedure for checking a product code on the manufacturer's Internet site. In contrast, the present disclosure enables a user to connect to a product manufacturer's website to confirm current offline product code matching updated online product serial number and to release the product locked in a security device with a release code given based on the confirmed product code, which makes up a 3-stage authentication procedure.

Further, patent 404,869 can only authenticate a product on the condition that the product is directly attached with its product serial number regardless of the validness of the code. In contrast, the present disclosure does not require a product code to be physically bound to the product, but is suffice to be hooked up or labeled on a product case for the successful authentication thanks to the provision of the product release code uniquely corresponding to the updated product serial number.

Thus, patent 404,869 involves modifying the original design of the product to permanently stick the code onto the product, whereas, the present disclosure imparts neither a harm nor a design change to the product by incorporating a temporary code means including a coded casing and a coded strap.

Further, patent 404,869 assumes only a single event of a product authentication request to be served and accompanied by a broken confidentiality of the code, whereas, the present disclosure provides against more than one authentication request for a product by stopping the existing product serial number from being utilized any more.

Furthermore, patent 404,869 leaves material data in the server vulnerable to computer hacking which will leak product serial numbers to be fraudulently used uninhibited on fake products, whereas, the present disclosure provides against server data theft and leakage by using a triple check system for constantly keeping the authentication service from being shut down and thereby precluding the possible act of distributing fake products as genuine.

Hereinafter, the distinguishing embodiment of the present disclosure is described with reference to the example drawing.

Figure 1:
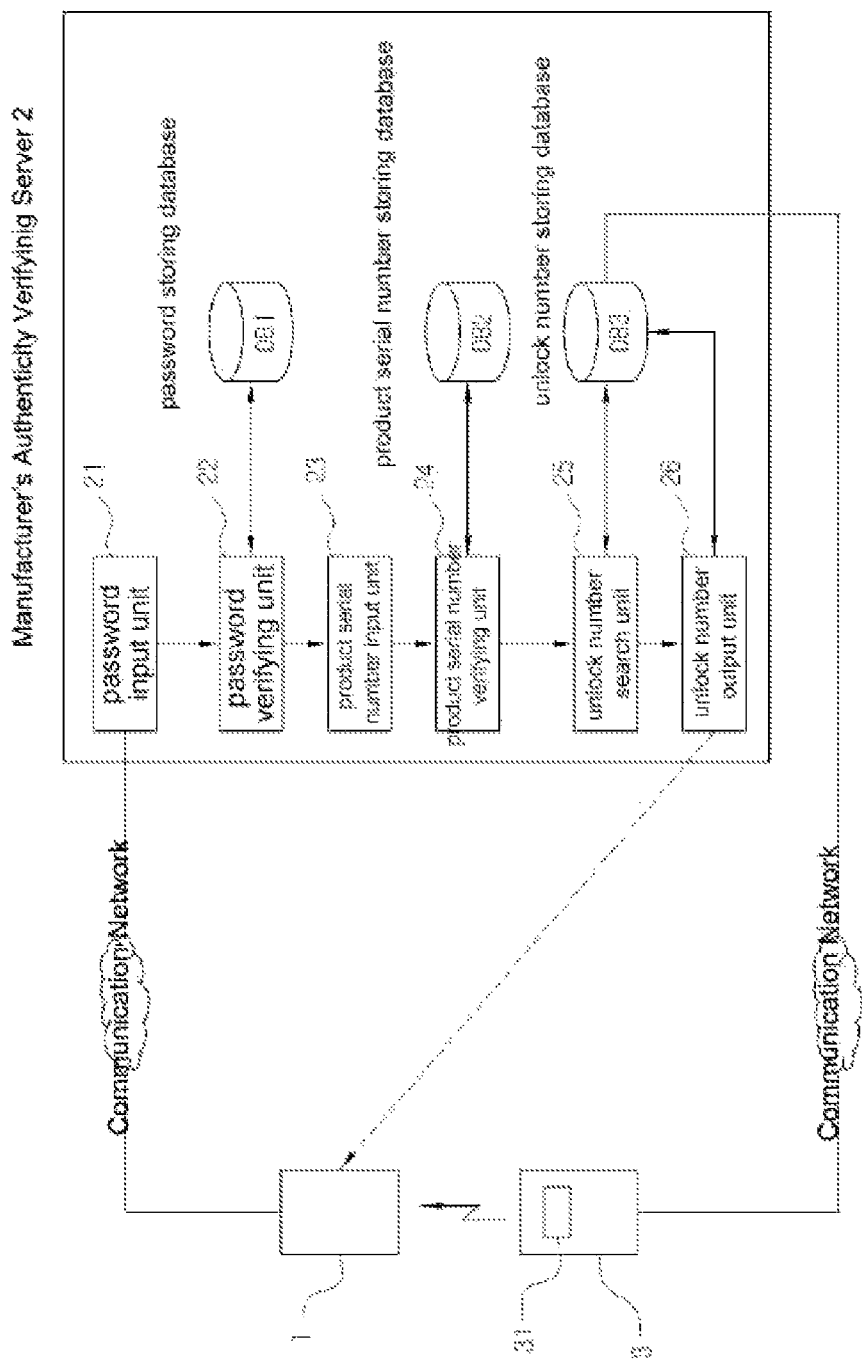
FIG. 1 is a general system block diagram of an authenticity verifying system AVS according to the embodiment of the present disclosure.
Figure 2:
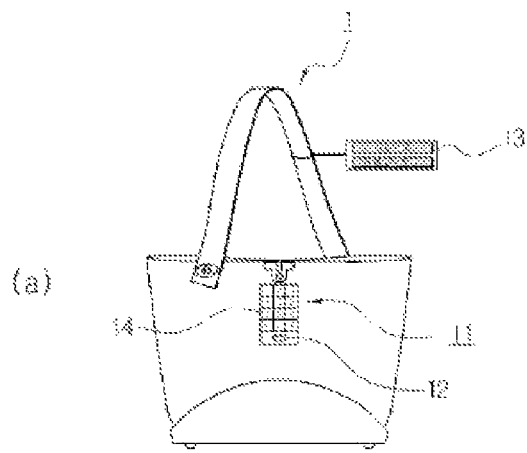
FIG. 2 is a detailed view of the product provided with a lock device according to the present disclosure, wherein portion (a) illustrates the lock device as applied to a bag, portion (b) illustrates the lock device as applied to an encased whisky, and portion (c) illustrates the lock device as applied to an encased watch.
Figure 2:
Figure 2:
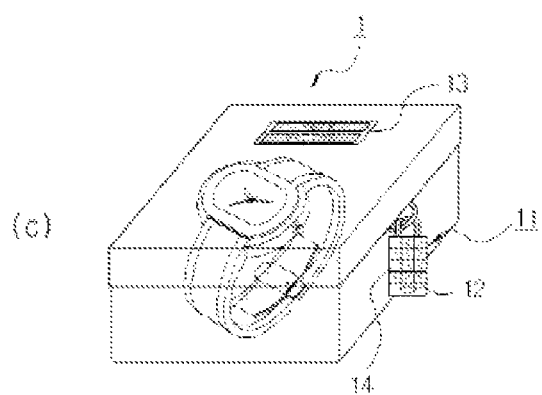

FIG. 1 is a general system block diagram of the authenticity verifying system AVS according to the embodiment of the present disclosure. FIG. 2 is a detailed view of the product provided with a lock device according to the present disclosure, wherein portion (a) illustrates an example in which the lock device is applied to a bag, portion (b) illustrates an example in which the lock device is applied to a whisky in a container, and portion (c) illustrates an example in which the lock device is applied to a watch in a container.

The authenticity verifying system according to the present disclosure illustrated in FIG. 1 includes a product 1, for example, a bag, which is equipped with a lock device, and a manufacturer's verifying server 2. Moreover, the present disclosure further includes a release code change device 3 which may change a release code of the product 1 when data on the server 2 is hacked or leaked due to a certain reason.

First of all, the bag is described as an example of the product 1 which is equipped with the lock device 11.

As illustrated in portion (a) of FIG. 2, the lock device 11 provided in a product 1, for example, a bag may be manufactured in a type where the lock device is attached to a product, a type where a ring of a product is used, a type where the lock device is put in a container in which a lock device may be hung, or the like. The locked to unlocked position of the lock device 11 with respect to a product essentially verifies that the product is definitely genuine, only when the product becomes available for use.

The lock device 11 may be a small digital lock in which total twelve-number key pad 14 with Arabic numerals 0 to 9, special symbols (* and #), or the like are arranged.

On the other hand, the lock device 11 may be not only the digital lock but also a common mechanical keypad.

The authenticity verifying procedure by the lock device 11 may be performed by using a digital method or a mechanical method. However, the digital method using the digital lock is more suitable when information is leaked.

Moreover, an infrared ray transceiving unit 12, which receives release code change information related to a change of a release code through an infrared ray communication from an infrared-ray transceiving unit 31 of a release code change device 3, is built in the lock device 11.

Before the infrared ray transceiving unit 31 of the release code change device 3 transmits the release code change information to the infrared ray transceiving unit 12 of the lock device 11, the infrared ray transceiving unit 31 of the release code change device 3 receives a product serial number of a product 1 through the infrared ray transceiving unit 12 to check it. Next, the infrared ray transceiving unit 31 of the release code change device 3 transmits data corresponding to a newly-generated release code coinciding with the product serial number of the product 1 to the infrared ray transceiving unit 12. Therefore, the release code of the lock device 11 may be changed.

When it is difficult to provide a keypad, in which ten numbers are arranged, in the lock device 11, a lock device (for example, a digital lock) including only one button may be used. In this case, a pressing count of the may be matched to each Arabic numeral, and thus, the digital lock may be unlocked. For example, pressing the button one time may mean Arabic numeral 1, and pressing the button two times may mean Arabic numeral 2.

The product 1 is installed with the scratch card 13 which includes the password of the product and the product serial number. In this case, after the purchaser buys the product 1, the purchaser may verify the product serial number and the password of the product by scratching the scratch card 13.

Subsequently, the manufacturer's verifying server 2 is described.

After the product purchaser buys the product 1, the purchaser verifies the password and the product serial number by scratching the scratch card 13 which is attached to the product 1.

Subsequently, the product purchaser uses a PC, a portable appliance or the like to access the website of the manufacturer through the commercial communication network, and then, access the manufacturer's verifying server 2.

After the product purchaser accesses the manufacturer's verifying server 2, a password input unit 21 of the server 2 receives a password which is written on the scratch card 13 of the product 1. A password verifying unit 22 verifies the received password by using database DB1 storing passwords.

Here, if the password of the product is not verified from the database DB1, the password verifying unit 22 determines the received password as an invalid password, and thus, it may be directly verified that the product is not a genuine article.

If a password of the product 1 is verified by the password verifying unit 22 by using the database DB1, the product serial number input unit 23 receives a product serial number provided on the scratch card 13. The product serial number verifying unit 24 verifies the received product serial number by using the database DB2 storing product serial numbers.

Here, if a product serial number is not verified from the database DB2, the product serial number verifying unit 24 determines the received product serial number as an invalid product serial number, and thus, it may be directly verified that the product is not a genuine article.

If a product serial number is verified by the product serial number verifying unit 24 by using a database DB2, a release code search unit 25 searches for a release code or an unlock number by using a database DB3 storing unlock numbers. A release code output unit 26 outputs a searched release code, and thus, the product purchaser may verify it.

The purchaser who verifies the release code outputted from the release code output unit 26 applies the release code to the release device 11 provided in the product 1 to unlock the lock device 11, and thus, the product purchaser may verify whether the product is a genuine article or not. The purchaser uses the product 1 after verifying an authenticity.

If the lock device 11 of the product 1 is not unlocked by the outputted release code, the purchaser may verify directly that the product 1 is not a genuine article.

Here, a password of the database DB1 in which passwords are stored, a product serial number of database DB2 storing product serial numbers, and a release code of database DB3 in which release codes are stored are matched in a relationship such as 1:1:1. Therefore, only one matched password, one matched product serial number, and one matched release code exist for one genuine article.

Moreover, if the server 2 receives the password and the product serial number to output the release code one time, the server 2 does not receive the password and the product serial number, which have been received once, anymore. Therefore, the password and the product serial number, which have been used once, and the release code, which has been outputted by using the password and the product serial number, may be used anymore.

The process is described next, in which a new release code is assigned to the lock device 1 when data on the server 2 is leaked through hacking, or the like.

When the manufacturer's verifying server 2 of the manufacturer's website is determined to be hacked, the server 2 is directly cut off. Next, the release code store database DB3 generates a new release code corresponding to the password and the product serial number which are matched to the product 1. Next, the release code change device 3 which is provided in each market accesses the server 2 through a commercial communication network to download a newly-generated release code from the database DB3.

The release code change device 3 which downloads a newly-generated release code from the database DB3 receives the product serial number of the product 1 from the infrared ray transceiving unit 12 of the lock device 11 by using the infrared ray communication through the infrared ray transceiving unit 31 to verify it. Next, the release code change device 3 transmits infrared ray data including information of the newly-generated release code to the infrared ray transceiving unit 12 of the lock device 11 of the product 1 which are disposed in the market.

The lock device 11 of the product 1 changes an existing release code to the newly-generated release code on the basis of data of the newly-generated release code received by using the infrared ray communication through the infrared ray transceiving unit 12.

To provide a more detailed description, when the information is, as described above, leaked by the hacking and etc., a new release code is generated in the database DB3. Next, the release code change device 3 downloads the database of the new release code and an existing release code by using a commercial communications network from the data base DB3. The release code change device 3, which downloads the data base of the newly-generated release code, reads the existing release code through the infrared-ray communication from the lock device 11 of the product 1, and then, searches the existing release code from the database which is built in the release code change device 3. Next, the release change number change device 3 transmits the newly-generated release code corresponding to the existing release code to the lock device 11 of the product 1 by using the infrared-ray communication. Therefore, the newly-generated release code is stored in the lock device 11 instead of the existing release code.

Thereafter, whether the product 1 is a genuine article or not may be verified through the process described above.

Figure 3:
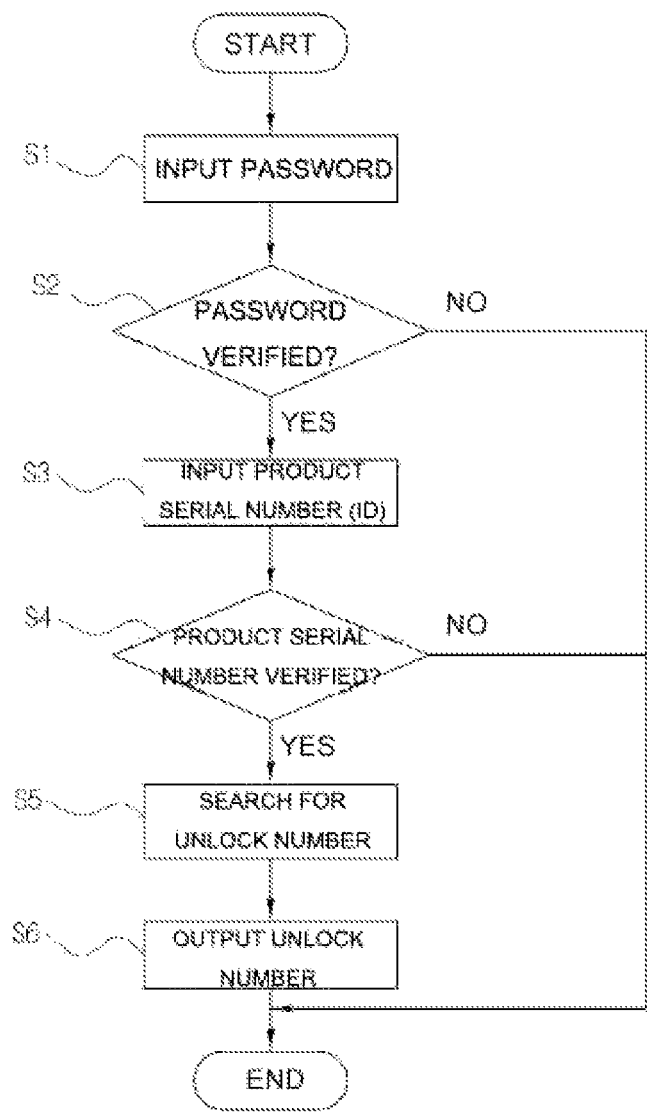
FIG. 3 is a flowchart of the process performed by a manufacturer's authenticity verifying server 2 according to the present disclosure for acquiring a release code.

FIG. 3 is a flowchart to describe the process in which the server 2 according to the present disclosure acquires a release code.

First, the purchaser accesses the manufacturer's verifying server 2. The password input unit 12 of the server 2 receives the password confirmed by scratching the scratch card 13 which is attached to the product 1 (step S1).

Subsequently, the password verifying unit 22 verifies a password of the product by using the database DB 1 in which passwords are stored (step S2).

If a password of the product in step S2 is not verified from the database DB1, it is determined that the password is not valid, and thus, the release code acquisition process terminates.

If a password of the product is verified from the database DB1, the product serial number input unit 23 receives a product serial number which is verified by scratching the scratch card 13 (step S3).

Subsequently, the product serial number verifying unit 24 verifies the received product serial number by using the database DB2 storing product serial numbers (step S4).

If a product serial number received in step S4 is not verified from the database DB2, it is determined that the product serial number is not valid, and thus, the release code acquisition process terminates.

If the product serial number verifying unit 24 verifies the product serial number from the database DB2, the release code search unit 25 searches the release code from the database DB3 in which release codes are stored (step S5).

If a release code is searched from the database DB3 in step S5, the release code output unit 26 outputs the searched release code, and thus, the purchaser may acquire the release code (step S6).

As described above, the purchaser, who acquires the release code from the release code output unit 26, applies the acquired release code to the lock device 11 provided in the product 1 to unlock the lock device 11. Therefore, the purchaser may confirm the product 1 as genuine and use it without a doubt.

According to the present disclosure, the verifying process for a password and a product serial number of a product, for which a release code has been assigned through a process of verifying the password and the product serial number, is not provided anymore. Therefore, the illegal manufacture using a leaked number is prevented fundamentally.

The present disclosure may be applied to all kinds of the products, an authenticity of which is difficult to be verified by a general consumer. That is, the present disclosure may be applied to the various kinds of high-end products or masterpieces such as a handbag, medicine, high priced machine component, wallet, scarf, shoes, pen, jewelry, gemstones, semiprecious stones or the like. Moreover, the present disclosure may be applied to high class alcohol products, for example, liquor, wine, or the like, and devices like brown goods.

For products without a ring or such anchor means, the inventive lock may be implemented in the form of a case (for example, acrylic case or the like) for securing goods.

For example, the present disclosure is applied to a watch. In this event, a manufacturer makes and packages their watch in its case with a small lock that is a digital lock device according to the present disclosure. Then, a scratch card embedded with a website access password and a product serial number is attached externally of the case. The purchaser of the product scratches the scratch card of the watch and exposes the password and the product serial number which are inscribed in the scratch card, accesses the website of a manufacturer of the product and inputs the password into the authenticity verifying system menu (Server). Following successful input of the password, the purchaser inputs the product serial number to receive a release code. The purchaser unlocks the lock device successfully by using the assigned release code, which confirms the article as genuine. This casing of the article and the lock device may be reused by the seller.

According to the present disclosure, the purchaser may immediately verify that the product is not genuine if any of the following events occurs:

1. The product lacks a lock device for the authenticity verification.

2. The product lacks a scratch card, with which a purchaser verifies a password and a product serial number for access, on the product.

3. The product has a scratch card which is already scratched, exposing the password or the product serial number.

4. When the password or the product serial number is inputted to the manufacturer's verifying server, the input is determined to be invalid.

5. The lock device cannot be unlocked with an assigned release code.

6. The lock device seems to be compromised on purpose by force.

In the above description, the method of verifying a password and a product serial number to verify whether the product is a genuine article or not is performed through a website server of a manufacturer. However, the method described above may be performed through an automated response system (ARS). Moreover, the system according to the present disclosure may be a server of a website of a manufacturer or ARS.

The invention claimed is:

1. A product authenticity verifying system comprising:
a product (1) comprising a lock device (11) with an infrared ray transceiving unit (12), and a scratch card (13) with a password and a product serial number written thereon;
a server (2) for verifying product authenticity, wherein the server is configured to be accessed by a computing device through a commercial communication network; and
a release code change device (3) configured to download a newly-generated release code that is newly matched to the password and the product serial number matched to the product (1) from the server (2) upon leak of information stored in the server (2) ;
wherein the server (2) comprises:
a password input unit (21) configured to receive the password written on the scratch card (13) of the product (1) from the computing device;
a password verifying unit (22) configured to verify the password by using a database (DB1) in which passwords are stored, on the basis of the password received from the password input unit (21);
a product serial number input unit (23) configured to receive the product serial number written on the scratch card (13) from the computing device, when the password of the product (1) is verified in the password verifying unit (22);
a product serial number verifying unit (24) configured to verify the product serial number by using a database (DB2) in which product serial numbers are stored, on the basis of the product serial number received from the product serial number input unit (23);
a release code search unit (25) configured to search for a release code that is matched to the password and the product serial number or for the newly-generated release code by using a database (DB3) in which release codes and newly-generated release codes are stored for responding to information leak, when the product serial number verifying unit (24) verifies the product serial number from the database (DB2); and
a release code output unit (26) configured to output the release code or the newly-generated release code searched from the release code search unit (25);
wherein the release code change device (3) transmits infrared ray data comprising information of the newly-generated release code downloaded from the database (DB3) to the infrared ray transceiving unit (12) of the lock device (11) by using an infrared ray communication through an infrared ray transceiving unit (31), and thus, an existing release code of the lock device (11) is changed to the newly-generated release code;
wherein each password of the database (DB1) in which passwords are stored, each product serial number of the database (DB2) in which product serial numbers are stored, and each release code of the database (DB3) in which release codes are stored are matched in a relationship of 1:1:1;
wherein the release code that is output by the release code output unit (26) is applied to the lock device (11), the lock device (11) is unlocked, and thus, the authenticity of the product (1) is verified; and
wherein the newly-generated release code that is output by the database (DB3) for responding to information leak irrespective of whether information leak occurs or not, is applied to the lock device (11), the lock device (11) is unlocked, and thus, the product's authenticity is verified.

2. The product authenticity verifying system of claim 1, wherein when the server (2) receives the password and the product serial number to output the newly-generated release code one time, the server (2) invalidates a same password and a same product serial number as the password and the product serial number which have been validated once.

3. The product authenticity verifying system of claim 1, wherein the lock device (11) comprises a digital lock with keypad (14).

4. The product authenticity verifying system of claim 1, wherein the lock device (11) comprises a mechanical number key.

* * * * *